R. S. BROWN.
WORK RACK.
APPLICATION FILED JULY 1, 1907.
904,175. Patented Nov. 17, 1908.
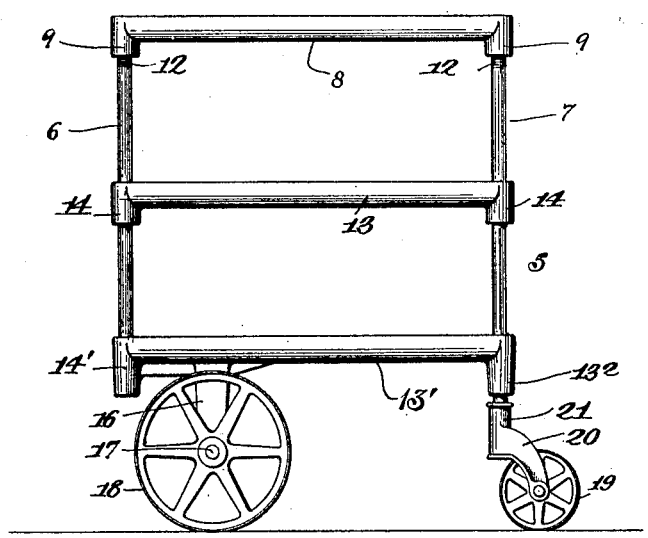
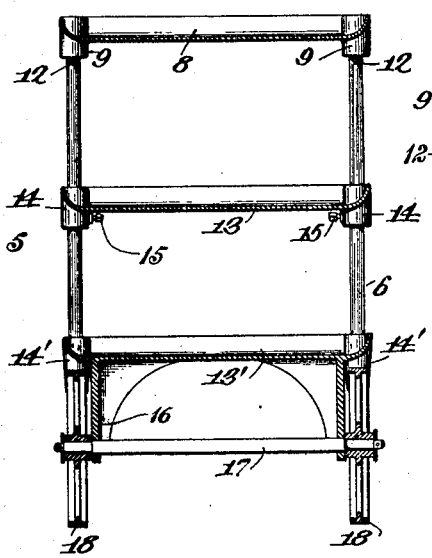
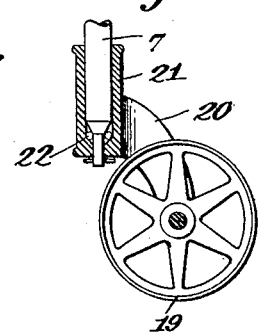
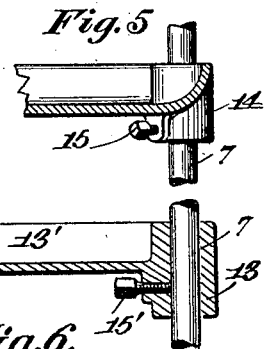
Witnesses:
Inventor:
Robt. S. Brown
By his Attorney,

UNITED STATES PATENT OFFICE.

ROBERT S. BROWN, OF NEW BRITAIN, CONNECTICUT.

WORK-RACK.

No. 904,175.

Specification of Letters Patent.

Patented Nov. 17, 1908.

Application filed July 1, 1907. Serial No. 381,645.

*To all whom it may concern:*

Be it known that I, ROBERT S. BROWN, a citizen of the United States, residing at New Britain, in the county of Hartford and State of Connecticut, have invented certain new and useful Improvements in Work-Racks, of which the following is a specification.

This invention relates to means for transporting heavy work, tools, etc., and more particularly to a device designed for inter-departmental use in conveying a load over uneven floors and sills.

In the preferred form of embodiment of the invention which is illustrated in detail in the drawings accompanying and forming part of this specification, the rack is provided at its front end with wheels of comparatively large diameter which are independently rotative to facilitate the turning of corners by said rack, and at its rear with swiveling wheels or casters of less diameter than the front wheels. These swiveling wheels or casters are adjustable by virtue of which the rack or truck can be leveled up to provide its even running on a floor or like support.

Referring to said drawings, Figure 1 is a side elevation of a rack or truck embodying my invention. Fig. 2 is a transverse section of the same. Fig. 3 is a detail view of one of the threaded bosses and a portion of one of the end or corner rods. Fig. 4 is a sectional detail view of one of the casters. Fig. 5 is a like view of a portion of an intermediate shelf or tray and part of a coöperating end rod. Fig. 6 is a sectional detail view showing a way of adjustably connecting one of the end rods with the lowest tray.

Like characters refer to like parts throughout the several figures of the drawings.

The truck or rack illustrated in full in Fig. 1 is denoted in a general way by 5. The frame of this truck is preferably formed of pairs of end rods or tubes as 6 and 7. A top tray as 8 is illustrated and is preferably provided at its corners with depending tubular bosses as 9 which are internally threaded as at 10 to receive the respective pairs of rods or tubes 6 and 7, which rods are externally threaded as at 12 (see Fig. 3) to provide for the longitudinal adjustment of said rods. I have also represented an intermediate tray 13 provided with tubular bosses as 14 through which the several rods pass, the said intermediate tray being as will be apparent vertically adjustable on said rods and being positively maintained in its adjusted position by suitable means as the screws 15. See Fig. 5. Said rods 7 are also slidable through the bosses $13^2$ but are normally held against endwise movement by screws as 15' tapped through said bosses and adapted to engage said rods 7. The construction described also provides for the endwise adjustment of said rods 7 to level the truck as will hereinafter appear.

Near the front or forward end of the truck or rack I provide suitable bearings as 16 which are shown as depending from the bottom tray 13'. In the present case I fix in these bearings an axle as 17 and I prefer to loosely mount on the ends of said axle wheels as 18 of large diameter. From this it will be obvious that said wheels are independently rotative and the mounting of said wheels in the manner indicated is a simple one of obtaining their independent action; this function however can be obtained in other ways. An advantage follows this relative operation of the wheels of large diameter, viz., the turning by the truck or rack is materially facilitated which is a consideration of importance when the same sustains a large or heavy load.

The rear wheels of the truck or rack are denoted by 19 and are shown as provided with brackets as 20 having sockets 21 to receive the lower ends of the rods 7. I may if desired mount in said sockets balls or their equivalents as 22 which may be held in position by means of some suitable retainer (not shown).

In practice when the parts of the rack are assembled the rods 6 are vertically immovable and while provision is made for adjustment to level the two sets of wheels, this is not accomplished by the rods 6 but by the manipulation of the rods 7 which as will be apparent have a sliding movement through the bosses $13^2$ and 14. The casters or rear wheels 19 are connected to said rods 7 and by running the latter out of their seats in the bosses 9 in the rear end of the top tray, the said rear wheels can in effect be lowered to level or horizontally aline them with the front wheels. The front rods 6 are stepped solidly or bottomed in the front bosses or sockets 14'. It might be added that prior to adjusting the rods 7 to take up wear or to level the rack, the rear screws 15 and the screws 15' are backed out sufficiently to free them from said rods; after adjustment is secured the screws will be tightened up. It is evident of course that the rods 7 are separately or individually adjustable; one of them may be lowered independently of the other or vice versa.

The truck or rack is simple in construction; it will support a heavy load which may be transported with ease and rapidity from place to place.

Of course I do not restrict myself to the precise disclosure hereby made for certain variations may be adopted within the scope of my claims. As indicated it is not essential that I loosely connect a pair of front wheels with a rigidly mounted axle but it is essential that the said wheels be independently rotative. In like manner I do not limit myself to the use of any particular number of trays.

It will be apparent from the foregoing description taken in connection with the annexed drawings that my work-rack or truck comprises a plurality of superposed trays, rod means supporting and connecting the trays at opposite ends of the device, wheel-means at one end of the rack or truck, swiveling wheel means at the opposite end of said rack or truck, connected with one of said rod means, one of said two last mentioned connected parts being adjustable to level the truck. The rod means in the present instance comprises four rods although this number is not essential while the swiveling means is adjustable by being connected with the ends 7 which are capable of endwise movement to secure such adjustment although the adjustment of the swiveling wheels, assuming that more than one is provided, might be otherwise obtained. In the language just employed I use the phrase "one of said two last mentioned connected parts being adjustable to level the truck". The two last-mentioned connected parts prior to this quoted language are the swiveling wheel means and the rod means connected therewith, said particular rod means being adjustable to effect the leveling of the truck or rack.

What I claim is:

1. A rack of the class described comprising a series of superposed trays, two pairs of rods supporting said trays, two of the rods being adjustable, brackets depending from the lowest tray, an axle rigidly carried by said brackets, wheels loosely carried by the axle, and swiveling casters supporting the adjustable pair of rods, the adjustment of the latter leveling the rack, and the wheels being of greater diameter than the caster.

2. A rack of the class described comprising a top tray, two pairs of rods connected at their upper ends with said tray, an intermediate tray adjustable on said rods, a bottom tray in which two of the rods are stepped, the other two rods being adjustable with respect to said bottom tray, bearings depending from the bottom tray, an axle rigidly carried by said bearings, wheels rotatively mounted on said axle, and swiveling casters, connected with the lower ends of said adjustable rods, the casters being of less diameter than said wheels.

3. A rack of the class described comprising a plurality of superposed trays, rod-means supporting and connecting the trays at opposite ends of the rack, wheel-means at one end of the rack, swiveling-wheel-means at the opposite end of said rack connected with one of said rod means, one of said two last-mentioned connected parts being adjustable to level the rack.

In testimony whereof I affix my signature in presence of two witnesses.

ROBERT S. BROWN.

Witnesses:
HERBERT V. L. SAPPER,
CATHERINE E. EGAN.